United States Patent [19]

Vansteelant

[11] Patent Number: 4,493,498

[45] Date of Patent: Jan. 15, 1985

[54] KNOTTER WITH AN IMPROVED GENEVA MECHANISM

[75] Inventor: Marc G. Vansteelant, Zedelgem, Belgium

[73] Assignee: Sperry Corporation, New Holland, Pa.

[21] Appl. No.: 431,517

[22] Filed: Sep. 30, 1982

[30] Foreign Application Priority Data

Oct. 7, 1981 [GB] United Kingdom ............... 8130247

[51] Int. Cl.³ ..................... A01D 59/04; B65B 13/26
[52] U.S. Cl. ......................................... 289/2; 289/11; 289/14
[58] Field of Search ................. 289/2, 11, 14; 56/343

[56] References Cited

U.S. PATENT DOCUMENTS 4,223,516 9/1980 Vansteelant ..................... 289/2 X
4,234,219 11/1980 Vansteelant ........................ 289/2

FOREIGN PATENT DOCUMENTS

486455 11/1929 Fed. Rep. of Germany .
885198 9/1943 France .
2041416 9/1980 United Kingdom .
2081312 2/1982 United Kingdom .

Primary Examiner—Louis K. Rimrodt
Attorney, Agent, or Firm—Darrell F. Marquette; Larry W. Miller; Frank A. Seemar

[57] ABSTRACT

A knotter comprising a billhook operable to form a knot in flexible material such as twine and being rotatable through first and second cycles during the knot tying operation, the billhook having jaws which can be opened or closed. Means are provided which are contactable by the billhook during both the first and second cycles of rotation thereof but which are operable to maintain the billhook jaws closed during the first cycle and to open and close the billhook jaws during the second cycle. The means may be in the form of a cam and releasable locking means may be provided to lock the cam against rotation during portions of the first and second cycles of billhook rotation.

15 Claims, 15 Drawing Figures

KNOTTER WITH AN IMPROVED GENEVA MECHANISM

BACKGROUND OF THE INVENTION

This invention relates to knotters for use with agricultural baling machines.

In conventional hay balers, crop material is picked up from the ground by a pick-up unit and fed into an elongated bale chamber in timed sequence with a reciprocating plunger. The plunger compresses the material into bales, and at the same time, gradually advances the bales towards the outlet end of the bale chamber. As the bales reach a predetermined length, a knotter is actuated to wrap twine around the bale and secure the ends of the twine together.

In a typical baler, the knotter is mounted on the bale chamber and includes a twine holder from which twine extends to encircle a bale. During the baling operation, a leading strand of twine is held by the twine holder and extends forwardly across a twine retainer finger and a billhook and then in front of the bale. The twine retainer finger supports the leading strand of twine so that it does not bear forcefully against the billhook. A needle is used to complete the encirclement of the twine around the bale and, when advancing, the needle lays a trailing strand across the twine retainer finger, billhook and twine holder. A twine finger captures the leading and trailing strands of twine and positively positions them against the heel of the billhook. The twine strands are then twisted into a bight by the billhook and a portion thereof is partially pulled through the bight to form a bow knot. A knife then cuts the twine from the twine supply so that the tied bale is complete in itself.

An improved knotter disclosed in British application No. 2,081,312, published Feb. 17, 1982, has been found to be highly reliable in operation. However, this improved knotter has a drawback in that it may give rise to knot misties due to the strands of twine entering between the jaws of the billhook prematurely. In the knot-tying operation of this improved knotter, the billhook rotates through a first cycle and a second cycle. The jaws of the billhook are opened in each cycle even though the strands of twine are only required to enter between the jaws during the second cycle. This dual opening of the billhook jaws for each knot-tying operation was not considered to impair the operation of the improved knotter since the opening during the first cycle, albeit unnecessary, should have no adverse effect. During the first cycle of the knot tying operation, the twine is pushed off a guide member and it has been found that sometimes the twine jumps from the guide member into the open jaws of the billhook, thus giving rise to a knot mistie. Such an occurrence is relatively rare but it is very desirable to eliminate all misties and the object of the present invention is to prevent misties due to the premature placement of the twine between the jaws of the billhook.

SUMMARY OF THE INVENTION

According to the present invention, a knotter comprises a twine holder operable to hold, during a knot-tying operation, a primary portion and a secondary portion of twine in which the knot is to be tied, and a billhook rotatable through a first cycle and a second cycle during a knot-tying operation. The billhook is operable during the first cycle to position the primary and secondary portions of twine relative to each other in preparation for the knot-tying operation, and operable during the second cycle to tie a knot in the primary and secondary portions. The billhook has two jaws capable of being opened and closed. The knotter further comprises means contactable by the billhook during both the first and second cycles but operable to maintain the billhook jaws closed during the first cycle and to open and close the billhook jaws during the second cycle.

The means contactable by the billhook may comprise a cam mounted for rotation and having a first and a second contact surface contactable by the billhook. The first contact surface is spaced at a shorter distance from the axis of rotation of the cam than the second contact surface. When the first contact surface is contacted by the billhook, the jaws of the latter remain closed and when the second contact surface is contacted by the billhook, the jaws thereof are opened. When either the first or second contact surface is contacted by the billhook, the cam is rotated thereby so that the other surface is moved into position for being contacted by the billhook during the next billhook cycle.

Preferably, the cam contactable by the billhook is generally square in plan view with one pair of opposed corners cut away. When the cam is contacted at these cut-away corners by the billhook, the jaws of the latter remain closed. The other pair of opposed corners are arranged so that when either of them is contacted by the billhook, the jaws of the latter are opened. Any time the cam is contacted by the billhook, the cam is rotated through 90 degrees. Each cut-away corner of the cam has a working surface which may be formed with a recess or may be generally concave to accommodate movement of the billhook relative to the cam without effecting any movement of the billhook jaws relative to each other. The other pair of opposed corners of the cam may be formed with a recess which positively locates the billhook to ensure opening of the billhook jaws and rotation of the cam through 90 degrees.

Preferably, locking means is provided to lock the cam against rotation during portions of the first and second cycles of billhook rotation. The locking means may be rendered operative immediately after the billhook has effected rotation of the cam to ensure that the inertia of the latter does not carry it to other than the desired position which would result in knotter malfunction. The locking means may comprise interactive extensions on the billhook and on the cam, respectively.

Since the billhook and the cam cooperate to drive the cam intermittently, they form a Geneva mechanism.

DESCRIPTION OF THE PREFERRED EMBODIMENT

Figure 1:
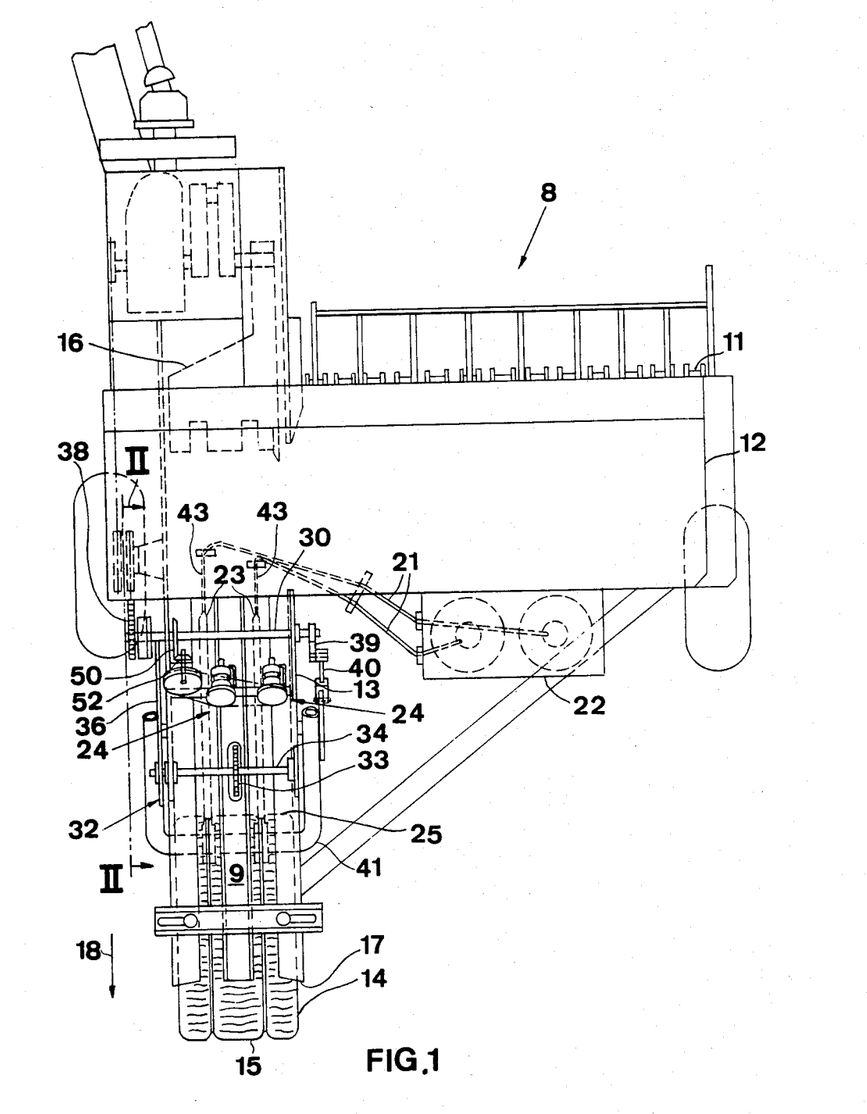
FIG. 1 is a top view illustrating a baler including two knotters according to the invention.

The agricultural baler, generally designated at 8 in FIG. 1, comprises a wheel supported chassis upon which are mounted a pick-up mechanism 11, a feeder mechanism 12 and a bale chamber 13. As cut crop material is picked up from the ground, it is fed in successive batches or charges into the inlet of the bale chamber 13 and the batches of material are compressed into bales 14 by a reciprocating plunger 16 which also advances the bales along the chamber 13 towards an outlet 17 in the direction of arrow 18.

Figure 2:
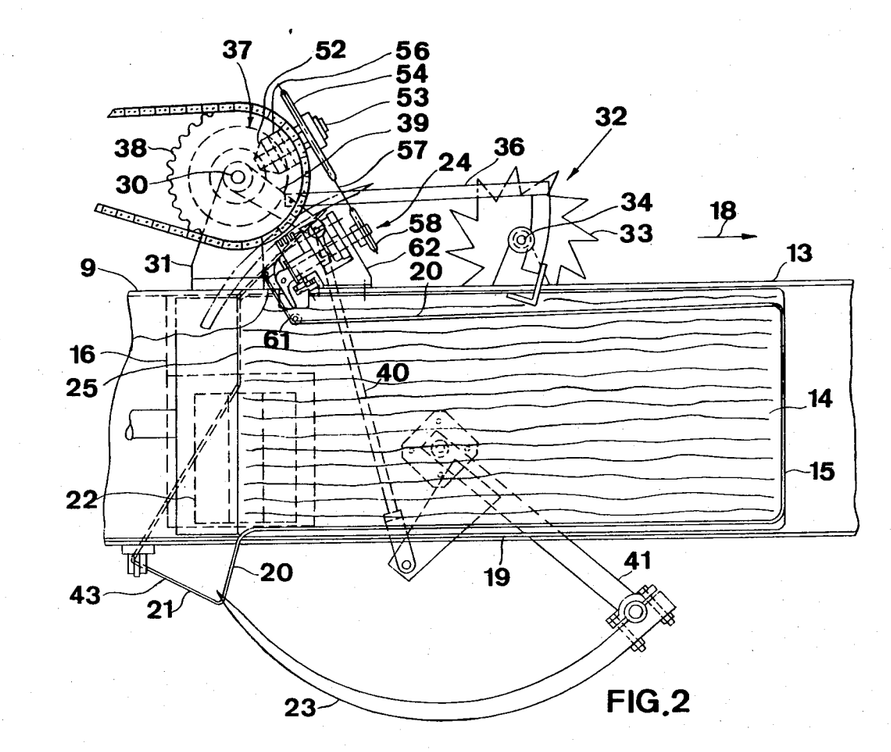
FIG. 2 is a sectional view taken along the line II—II of FIG. 1.

As best seen in FIG. 2, a primary portion or length 20 of twine or other flexible tie material 21 extends across the bale chamber 13 in the path of the leading end 15 of each bale 14 from a supply reel or container 22 and passes through the eye of a needle 23 with the primary portion 20 of the twine 21 being held in a knotter 24 mounted on a top wall 9 of the bale chamber 13. The baler preferably carries a pair of identical knotters 24 arranged to cooperate with a pair of needles 23.

A main drive shaft 30 (FIGS. 1 and 2) is rotatably journalled in supports 31 on the upper wall of the bale chamber 13 at a distance thereabove and transversely of the bale chamber. The main drive shaft 30 is intermittently actuated by a conventional trip mechanism 32 which includes a starwheel 33 arranged to engage the bale of hay or other material as it is being formed, whereby it is rotated about a shaft 34 as the bale 14 moves along the chamber 13. The shaft 34 is operatively coupled to a trip lever 36 which itself is connected to a clutch mechanism 37 mounted on the main shaft 30. One half of the clutch mechanism 37 is driven continuously through a chain or sprocket drive transmission from an intermediate shaft on the baler, only a sprocket 38 thereof being shown in FIGS. 1 and 2.

As the trip mechanism 32 actuates the clutch mechanism 37, the main shaft 30 is driven to initiate the tying of a knot by each knotter 24. The main shaft 30 has a crank arm 39 attached thereto at its end opposite to the clutch mechanism 37, the crank arm 39 being connected by a pitman or link 40 to a needle frame 41 which carries the pair of needles 23.

No further elaboration will be given concerning the structural details of the trip mechanism 32 and the needle frame 41 since these details are sufficiently well known in the art. Upon actuation of the clutch mechanism 37, the main shaft 30 is driven and the needles 23 move from the rest position (indicated by full lines in FIG. 2) to their full throw position (shown partially in phantom lines in FIG. 2) to wrap the respective twines 21 around the bottom and trailing ends 19 and 25, respectively, of the bale 14 and place the secondary portions 43 of the twines in the respective knotters 24.

Each twine 21 loops back over the needle 23 to the reel 22 in the full throw position, thereby leaving a new primary portion or length of twine 20 across the path of the next bale to be formed. As each needle 23 returns to its rest position, the ends of each primary and secondary portion 20 and 43 are twisted and tied together by the knotter 24, with the primary and secondary portions 20 and 43 being severed at the end of the tying operation. The entire knotting or tying operation takes place between successive strokes of the baler plunger 16.

The main shaft 30 also has attached thereto a single conical gear segment 50 having teeth over only about one-third of its circumference. The gear teeth are arranged to mesh with the teeth of a conical gear 52 which is mounted on one end of a stub shaft 53 on the other end of which is mounted a sprocket 54. The shaft 53 is journalled in a support 56. A chain 57 engages the sprocket 54 and sprockets 58 of the respective knotters 24 of which only one is seen in FIG. 2.

As already stated, the two knotters 24 are identical and, therefore, only one will be described in further detail in relation to the associated needle 23 and other components. It should be noted that the general construction and operation of each knotter 24 is identical to that disclosed in the aforementioned British patent application No. 2,081,312.

Figure 4:
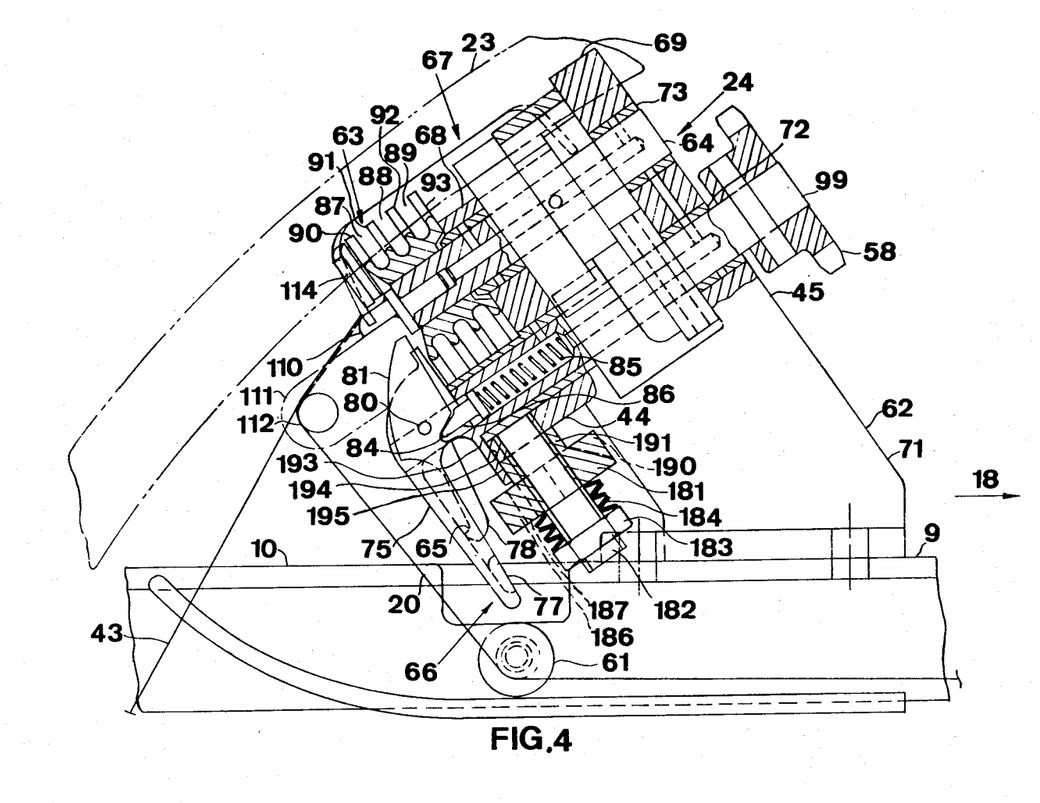
FIG. 4 is a part sectional view taken along the line IV—IV of FIG. 3.

Referring to FIG. 4, each knotter 24 is mounted on the top wall 9 of the bale case 13 adjacent an elongate aperture 10 therein and in the vicinity of twine guide rollers 61. The knotter 24 includes a base or support frame 62, a twine holder 63 rotatably mounted by a twine holder shaft 64 on the support frame 62, a billhook 66 including a hollow shaft 99 extending parallel to the twine holder shaft 64 and rotatably supported on the support frame 62, and a Geneva mechanism 67 between the billhook shaft 99 and the twine holder shaft 64.

The support frame 62 includes a generally upright member 71 carrying twin cylindrical bearing sleeves 72 and 73, respectively. The twine bearing sleeves 72,73 comprise forward and rearward sections 44,45 and 68,69 respectively, spaced from each other and defining therebetween a free space. A further support member 28 is provided at a distance to the left of the forward section 44 of the twin bearing sleeve.

Each knotter 24 comprises an actual knotting mechanism or billhook, indicated generally at 66, with which is associated the hollow billhook or twister shaft 99 rotatably journalled in the sleeve sections 44,45 of the lower bearing sleeve 72. The twister shaft 99 supports at one end the associated driving sprocket 58. The billhook 66 comprises a fixed jaw 75 inclined at about 90 degrees to the end of the twister shaft 99 opposite to the sprocket 58 and adjacent a twine holder of the knotter which is generally indicated at 63. In the rest position, the billhook 66 projects downwardly towards and partially through the aperture 10 in the top wall 9 of the bale chamber 13. At the side facing the twister shaft 99, the fixed jaw 75 comprises an elongated groove or recess 77 for receiving a crochet hook 65 of a movable jaw 78 of the billhook 66. At the junction of the fixed jaw 75 and the twister shaft 99, the fixed jaw 75 is provided with an elongated slot through which the movable jaw 78 extends and in which it is pivotally mounted by a pivot pin 80.

The movable jaw 78 has a heel portion 81 at one end and a recess or notch 84 therein slightly offset relative to the pivot pin 80. A spring 85 is provided inside the hollow twister shaft 99 to normally urge the movable jaw 78 toward the closed position. The spring 85 abuts at one end against the end of the bore in the hollow shaft 99 and at the other end against an abutment member 86. The abutment member 86 has an angled end adapted for engagement with the notch or recess 84 in the movable jaw 78.

The twister shaft 99 carries intermediate the sleeve sections 44,45 of the twister shaft bearing sleeve 72 one-half of the Geneva drive mechanism 67 which is intended for driving the twine holder 63. This Geneva drive mechanism 67 is described in the aforementioned British Pat. No. 2,081,312.

Figures 3, 5, 6:
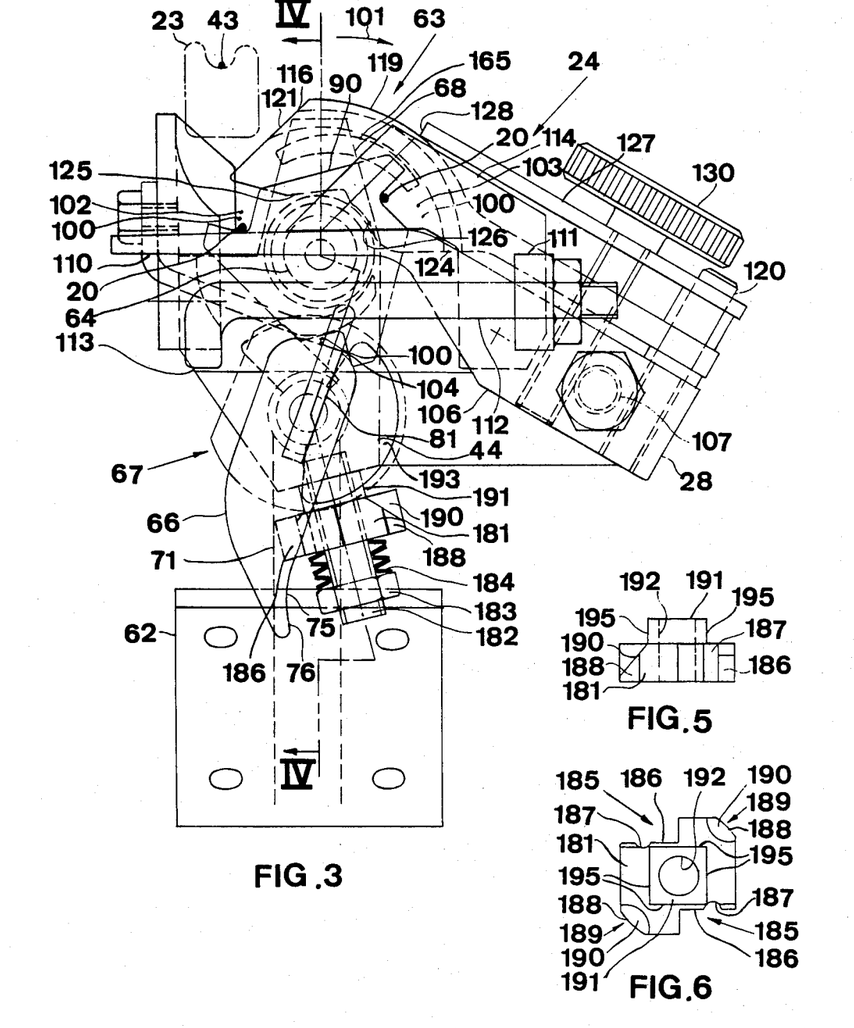
FIG. 3 is a view of one knotter taken in the direction of the billhook shaft thereof.
FIG. 5 is a side view of a component of the knotter of FIG. 3.
FIG. 6 is a top view of FIG. 5.

The twine holder 63 itself comprises four generally triangular shaped flanges or discs 90,91,92 and 93 which are spaced from each other to define respective slots or grooves 87,88 and 89 therebetween of varying depth. The flanges 90,91,92,93 comprise V-shaped recesses or notches 100 as seen in FIG. 3, which have a smaller depth than the grooves 87, 88 and 89 at the location where the recesses 100 are provided.

The flanges or discs 90,91,92 and 93 are welded or otherwise secured to the twine holder shaft 64 in a manner so that they extend parallel to each other with the recesses 100 aligned with each other in the direction of the twine holder shaft 64. Thus the recesses 100 define three grooves 102,103 and 104 which are oriented parallel to the twine holder shaft 64.

The fixed jaw 75 of the billhook 66 is dimensioned and positioned relative to the twine holder flanges 90 to 93 so that upon rotation, the fixed jaw 75 moves in front of the twine holder 63 whereby, as seen in the direction of the billhook shaft 99, the plane described by the billhook 66 substantially overlaps the twine holder 63.

A knife arm 106 (FIG. 3) for the twine holder 63 is bolted at 107 to the support member 28 of the frame 62 and extends in front of the center of the twine holder 63. The knife arm 106 is further extended beyond the center of the twine holder 63 to form a first stationary twine guide 110 in front of the twine holder 63. The first stationary twine guide 110 is positioned so that the tip 76 of the billhook 66 can pass in front thereof during rotation.

A support member 111 projects forwardly from the knife arm 106 and carries adjacent its free end a second stationary transverse twine guide 112. This second twine guide 112 is positioned slightly lower than the first twine guide 110 and also closer to the front so that, during operation, the billhook 66 passes between the first and second twine guides 110 and 112. This second twine guide 112 has a downwardly inclined free end 113 which is positioned inwardly of the turning circle of the tip 76 of the billhook 66 when viewed in the direction of the billhook shaft 99. Attached to the knife arm 106 and in shearing contact with the underside of the lower twine holder flange 90 is a stationary knife 114.

Three twine retainer fingers of which only one is shown at 116 in FIG. 3 are integrally connected at one end by a mounting member 119 which is pivotally mounted at 120 to the support member 28 of the frame 62. The twine retainer fingers 116 extend in a transverse direction across the twine holder 63 and in part into the grooves 87,88 and 89, respectively. The mounting member 119 and the fingers 116 have an inclined edge 121 opposite the pivot, which acts as a twine guide, assisting in the positioning of the secondary position 43 of the twine in the groove 102 as seen in FIG. 3. The edges of the fingers 116 facing towards the twine holder 63 and extending between the flanges 90 to 93 thereof each comprise a straight section 124 and a curved section 125, separated by a curved section 126 of a smaller radius than the section 125. The fingers 116 are resiliently urged into the grooves 87,88 and 89 by a leaf spring 127 which also is pivotally mounted on the pivot 120 and which extends in the direction of the fingers 116 and contacts the mounting member 119 at 128. An adjustable screw 130 mounted on the support member 28 between the pivot 120 and the contact point 128 provides adjustment of the force exerted by the spring 127 on the twine fingers 116.

The part of the illustrated embodiment already described is identical to that disclosed in the aforementioned British Pat. No. 2,081,312. The difference between the two embodiments lies in the actuation of the jaws 75 and 78 of the billhook 66. In the embodiment of the present invention, the movable jaw 78 of the billhook 66 has a heel portion 81 at one end which acts as a cam follower with respect to a cam 181 (FIGS. 3–6) as the twister shaft 99 is rotated. The cam 181 is mounted for rotation on a stub shaft 182 provided on the knotter frame 62 at the lower and forward end of the front sleeve section 44. A nut 183 and a cup spring 184 retain the cam 181 on the stub shaft 182 such that the cam 181 is not freely rotatable.

FIGS. 5 and 6 show that the cam 181 is essentially square in plan view although two diametrically opposed corners are cut away at 185 to provide working surfaces 186 which are formed with concave recesses or channels 187 extending parallel to the longitudinal axis of the stub shaft 182. The edges of the working surfaces 186 nearest to the billhook 66 are chamfered at their outer ends. The cam 181 has two other working surfaces formed by the two opposed corners 189 which are not cut away although those corners are formed with concave recesses 190 and are rounded at 188.

An extension 191 which is square in plan view, as seen in FIG. 6, is formed on one side of the cam 181. A bore 192 is provided through the cam 181 and extension 191 for the reception of the stub shaft 182. The extension 191 forms part of a locking means which serves to lock the cam 181 against rotation at certain points during its cycles of operation as will be described. The locking means also includes an extension 193 provided on the fixed jaw 75 of the billhook 66 as seen in FIG. 3.

The extension 193 extends over an arc of 155 degrees and is rotatable with the billhook 66 about an axis which is perpendicular to the axis of rotation of the cam 181. The extension 193 is offset from the axis of rotation of the cam 181 and has a flat face 194 which is engageable with one of the four faces 195 of the cam extension 191 at a time. Such engagement locks the cam 181 against rotation. Since the locking of the cam 181 by the components 191 and 193 is required over 270 degrees of each revolution of the billhook 66, it might be expected that the extension 193 should extend over a similar angle. However, such an extension would interfere with the rotation of the cam 181 at the appropriate time. Nevertheless, when no locking of the cam 181 is effected by the extension 193 but is ideally required, the cup spring 184 effectively prevents any inadvertent cam rotation.

Upon rotation of the main shaft 30, the needles 23 move from their rest position to their full throw position during the first 180 degrees of rotation of the main shaft 30. During the next 180 degrees that the main shaft 30 is rotated, the needles 23 are fully retracted to their rest position. The conical gear segment 50 on the main shaft 30 is dimensioned and positioned so that during the first 120 degrees and the last 120 degrees of rotation of the main shaft 30, the knotters 24 are not actuated. The knotters 24 are driven only during the second 120 degrees of rotation of the main shaft 30, that is from the moment the needles 23 have reached the vicinity of the knotters 24 in their full throw position to the point where they move away from the vicinity of the knotters 24.

The transmission ratio between the main shaft 30 and the billhook shafts 99 is such that during the second 120 degrees of rotation of the main shaft 30, the billhooks 66 make two complete revolutions, i.e., rotate through 720 degrees. Finally, the Geneva mechanism 67 of each knotter 24 is arranged so that each billhook shaft 99 drives the twine holder shaft 64 over 60 degrees during the last quarter of each full revolution of the billhook 66. Thus, during one complete knotting cycle, the twine holder 63 is rotated twice through 60 degrees, i.e., in total through 120 degrees. This intermittent rotation of the twine holder 63 is thus obtained during the last 15 degrees of rotation of the main shaft 30 before the needles 23 reach their full throw position and during the last 15 degrees of rotation of the main shaft 30 before the drive to the billhook 66 is interrupted.

Figure 7:
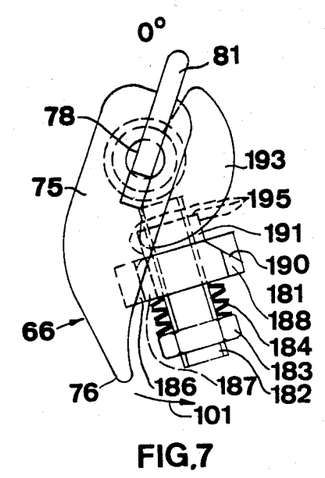
FIGS. 7 to 14 show different operative positions of certain components useful in explaining the operation of the present invention.

As long as the clutch mechanism 37 is not actuated, all components of each knotter 24 are in their rest positions of FIGS. 3, 4 and 7. This means that the needles 23 are in their rest position, as shown in full lines in FIG. 2, while the billhooks 66 project downwardly as seen in FIGS. 2, 3 and 4. As already mentioned, a primary portion 20 of twine 21 extends across the bale chamber 13 in the path of the leading end 15 of the bale 14 being formed and passes through the eye of a needle 23, with the free end of the primary twine portion 20 being supported in the twine holder 63 of the associated knotter 24. Since two knotters 24 are employed, each bale 14 is bound by two primary portions 20 of twine. The free end of the primary portion 20 of the twine 21 is received in the groove 103 of the twine holder 63 and firmly held in position by the twine retainer fingers 116 between the curved sections 126 thereof and the twine holder flanges 90 to 93. From the groove 103, the primary twine portion 20 extends away from the billhook 66 through the Geneva mechanism 67. The primary twine portion 20 extends below a fifth stationary twine guide 165, then downwardly and forwardly into the next groove 102 of the twine holder 63, then down across the first and second stationary twine guides 110 and 112, respectively and then finally down and around the twine guide roller 61 into the bale chamber 13. The free end of the primary portion 20 of the twine 21 is tensioned and thus forcefully bears against all the twine guides and holders listed above, in order to be properly positioned relative to the billhook 66.

As a bale 14 is being formed and moved along the bale chamber 13, the starwheel 33 is rotated thereby. As the bale reaches a predetermined length, the starwheel 33 actuates the clutch mechanism 37, whereupon the main shaft 30 is rotated through 360 degrees. During the first 180 degrees of rotation of the main shaft 30, the needles 23 move from their rest positions to their full throw positions (phantom lines in FIG. 2) along a path which is closely adjacent the first and second stationary guide members 110 and 112, through the twine gripping area of the twine holder 63.

During the next 180 degrees of rotation of the main shaft 30, the needles 23 are retracted and returned to their rest positions. During the initial 120 degrees of movement of the main shaft 30, the teeth of the gear segment 50 are not in mesh with the teeth of the conical gear 52, whereby neither knotter 24 is operated. During the initial movement of the main shaft 30, each needle 23 carries the end of the secondary twine portion 43 from the position shown in full lines in FIG. 2 around the bottom and trailing ends 19 and 25 of the bale 14 to the position shown in phantom lines in FIGS. 2 and 4. Then the needle 23 places the secondary twine portion 43 alongside the related primary twine portion 20 against the first and second stationary guide members 110 and 112 and in the groove 102 in the twine holder 63 and in a particular relationship with the Geneva mechanism 67.

At the point in the cycle of the main shaft 30 where the teeth of the gear segment 50 starts to mesh with the teeth of the conical gear 52, the billhook 66 starts rotating. By the time the teeth of the gear segment 50 come out of mesh with teeth of the conical gear 52, the billhook 66 will have completed two full revolutions which constitute first and second cycles of rotation. This billhook rotation is shown at 90 degree intervals in FIGS. 7 to 14.

Figure 8:
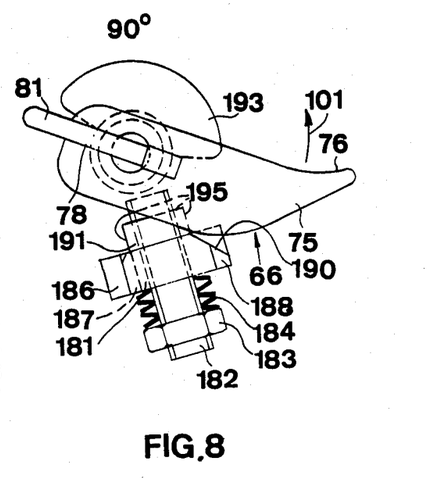

In the rest position (FIG. 7), the cam 181 is locked against rotation by the engagement of the billhook extension 193 with one face 195 of the cam extension 191, with the billhook 66 extending downwardly as seen in FIG. 7 and clearing the cam 181 as seen in FIG. 4. During the first 90 degree of rotation of the billhook 66, the extension 193 disengages the extension 191 so that the cam 181 is no longer positively locked in place but is prevented from inadvertent rotation by the cup spring 184. The cam 181 thus remains stationary and the relative positions of the billhook 66 and cam 181 after 90 degrees of billhook rotation are shown in FIG. 8. The cam 181 also remains stationary during the next 90 degrees of rotation of the billhook 66 when the latter reaches the position of FIG. 9 where the heel portion 81 of the movable billhook jaw 78 is about to engage the cam 181 which is still not positively locked in place.

Figure 9:
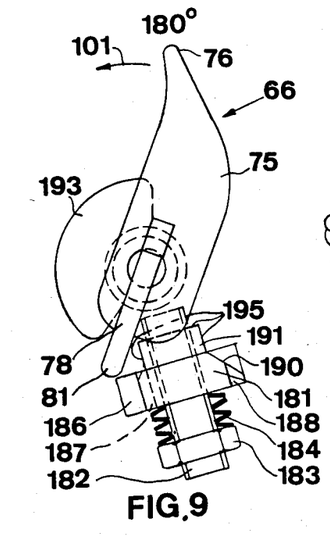

More specifically, the heel portion 81 is about to engage one of the cut-away corners 185 of the cam 181 at the associated working surface 186. In fact, the heel portion 81 engages the recess 187 in the working surface 186 and the cut-away portion 185 is shaped so as to effect no opening on the billhook jaws 75,78 on movement of the billhook 66 to the 270 degree position of FIG. 10. Alternatively, the entire working surface 186 can be made concave rather than having the recesses 187 therein. The profile of each working surface 186 allows a smooth, sliding contact with the billhook heel portion 81 without opening the billhook jaws 75,78. As the heel portion 81 engages the recess 187, the cam 181 is rotated about the stub shaft 182. As the billhook 66 moves moves to the position of FIG. 10, the billhook extension 193 engages the cam extension 191 along a face 195 that is at right angles to the face 195 which is engaged in the rest portion of FIG. 7. Thus the cam 181 is rotated through 90 degrees but is positively locked in place against any further rotation which could cause knotter malfunction.

Figure 10:
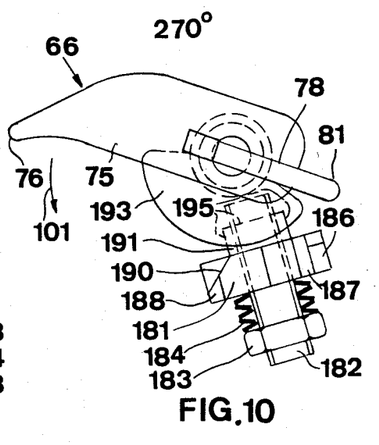
Figures 11, 12:
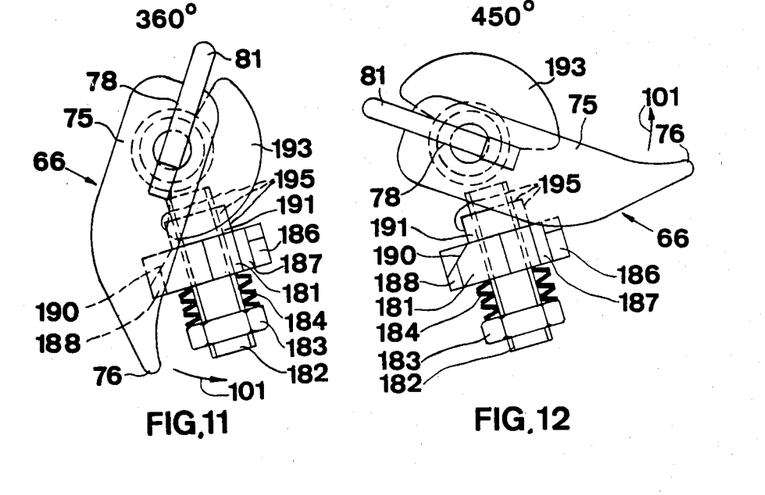
Figure 13:
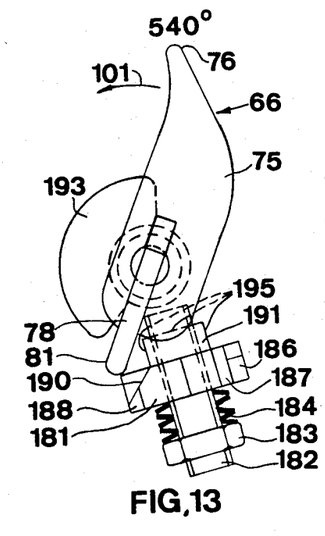

On continued rotation of the billhook 66 from the 270 degree position of FIG. 10 to the 360 degree position of FIG. 11, the cam 181 remains positively locked. On further rotation of the billhook 66 to the 450 degree position of FIG. 12 and then to the 540 degree position of FIG. 13, the heel portion 81 of the billhook movable jaw 78 is about to engage the cam 181 for the second time but this time at a non-cut-away corner 189. The heel portion 81 actually engages the recess 190. The radius between the axis of rotation of the cam 181 and the recess 190 is larger than the radius between that axis and the working surface 186 previously engaged. Therefore, the heel portion 81 is moved against the action of the spring 85 and the billhook jaws 75 and 78 are opened. The twine portions 20 and 43 are in a position relative to the billhook 66 to enter the open jaws 75 and 78.

Figure 14:
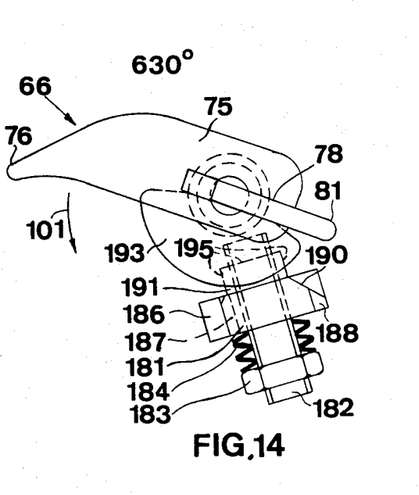

The jaws 75 and 78 close once the heel portion 81 disengages the cam corner 189 referred to above as the billhook 66 moves to the 630 degree position of FIG. 14. The action of the heel portion 81 on the cam surface 190 then rotates the cam 181 through another 90 degrees and the billhook extension 193 engages the cam extension 191 to positively lock the cam 181 in the FIG. 14 position.

The cam 181 is thus positioned for the next knot-tying operation with a cut-away corner 185 (opposite to the one engaged by the heel portion 81 on movement of the billhook 66 from the FIG. 9 to the FIG. 10 position) ready for engagement by the heel portion 81 at the next 180 degree position. The billhook 66 rotates through another 90 degrees from the FIG. 14 position to complete two revolutions (i.e., 720 degrees) but this does not affect the position of the cam 181 which remains positively locked in place during this movement.

Since the billhook 66 and cam 181 cooperate to drive the latter intermittently, they form a Geneva mechanism.

It should be noted that the extensions 191 and 193 interact to positively lock the cam 181 in place immediately after it has been moved by the billhook 66. In other words each time the cam 181 is given inertia, it is then locked in place to ensure that the inertia does not carry the cam 181 to another position which would result in a malfunction of the knotter. However, when not given inertia, the cam 181 is retrained from movement by the cup spring 184 as described.

The specific details of the knot-tying operation have not been described since they are identical to those given in British Pat. No. 2,081,312. The twine cutting operation has also not been described for the same reason. However, it should be understood that during the first cycle (360 degrees) of billhook rotation the primary and secondary portions of twine 20,43 are positioned relative to each other in preparation for the knot-tying operation, and that during the second cycle (360 degrees) of billhook rotation the knot is tied in those twine portions.

The single billhook jaw opening during each two revolutions of the billhook 66 entirely eliminates the problem of the twine portions 20 and 43 entering the billhook jaws 75,78 prematurely. Also, it reduces by half the number of times the billhook jaws 75 and 78 open and close which reduces significantly the wear on the pivot pin 80 of the movable jaw 78. With the elimination of the problem referred to by the present invention, it would be possible to dispense with the twine guide 112 which originally was provided principally to help prevent the twine entering the billhook jaws 75,78 prematurely. However, it is preferred to retain the guide 112 as it has been found to serve a secondary function of providing more twine for the knot-tying operation.

Figure 15:
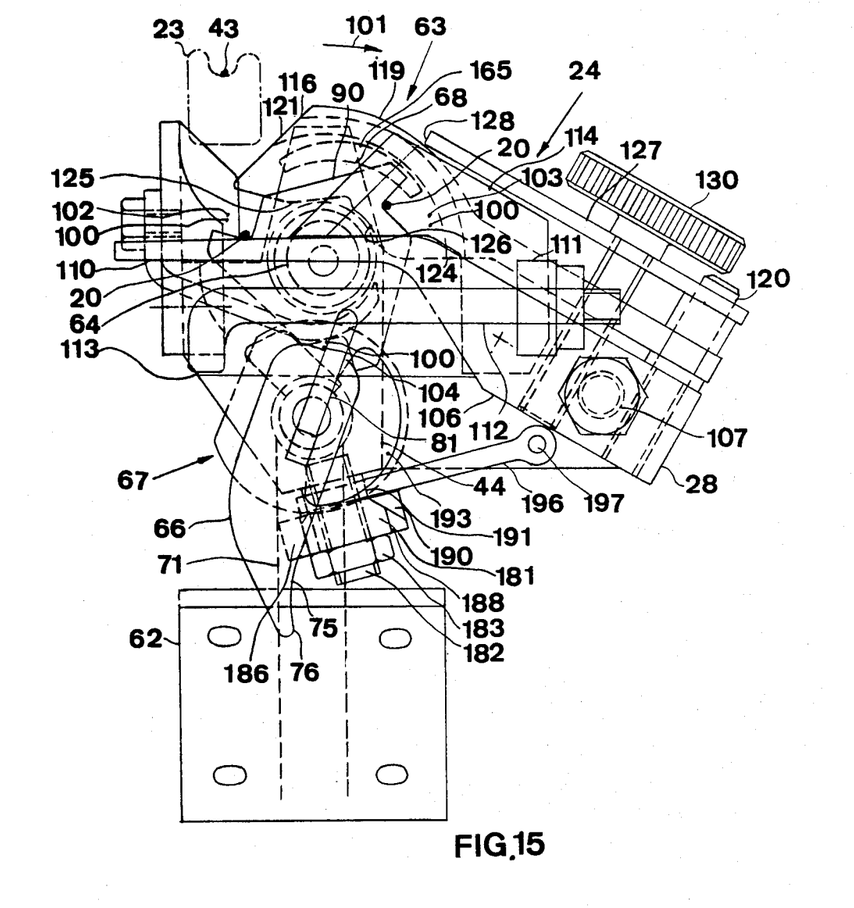
FIG. 15 is a view similar to FIG. 3 of another embodiment of the invention.

FIG. 15 shows an alternative embodiment wherein cup spring 184 has been replaced by a leaf spring 196 which is disposed to cooperate in turn with the four faces 195 of cam extension 191. Leaf spring 196 is attached at 197 to the chassis 62 and extends transversely therefrom with its free end resiliently abutting against the cam extension 191. Leafspring 196 continuously tends to hold cam 181 in a position wherein any of the four faces 195 of the cam extension 191 extends parallel to said leafspring 196. When the billhook 66 forcefully causes the cam 181 to rotate, the leafspring 196 resiliently bends away to allow said rotation to take place. Since the cam extension 191 is square in plan view, the cam 181 is rotated each time over precisely 90 degrees. Thus, when no positive locking of the cam 181 is provided by the locking means 191,193 but is ideally required, the leafspring 196 effectively prevents any inadvertent cam rotation.

This alternative embodiment with the leafspring 196 may be further simplified by omitting the billhook extension 193, whereby the positioning of the cam 181 then will be obtained solely by the cam extension 191 cooperating with the leafspring 196.

The following claims are intended to cover all modifications and variations of the preferred embodiments of the present invention without departing from the spirit and scope of the invention.

Having thus described the invention, what is claimed is:

1. In a knotter having a twine holder operable to hold, during a knot-tying operation, a primary portion and a secondary portion of twine in which a knot is to be tied, a billhook rotatable through a first cycle and a second cycle during a knot-tying operation, the billhook being operable during the first cycle to position the primary and secondary portions of twine relative to each other in preparation for the knot-tying operation, the billhook being operable during the second cycle to tie the knot in the primary and secondary portions, the billhook comprising two jaws capable of being opened and closed, the improvement comprising: means contactable by the billhook during both the first and second cycles but operable to maintain the billhook jaws closed during the first cycle and to open and close the billhook jaws during the second cycle, and wherein the means contactable by the billhook comprises a cam mounted for rotation and being generally square in plan view with one pair of opposed corners being cut away so that, when one of the cut-away corners is contacted by the billhook, the jaws thereof remain closed, and with the other pair of opposed corners being arranged so that, when one of them is contacted by the billhook, the jaws thereof are opened.

2. In a knotter according to claim 1, wherein the cam has a first and second contact surface contactable by the billhook; the first contact surface being spaced at a shorter distance from the axis of rotation of the cam than the second contact surface so that, when the first contact surface is contacted by the billhook, the jaws thereof remain closed, and when the second contact surface is contacted by the billhook, the jaws thereof are opened.

3. In a knotter according to claim 2, wherein the cam is arranged to be rotated when one of the first and second contact surfaces is contacted by the billhook so that the other one of the first and second contact surfaces is moved into a position for being contacted by the billhook.

4. In a knotter according to claim 2, the improvement further comprising releasable locking means to positively lock the cam in place against rotation at least during portions of the first and second cycles of billhook rotation.

5. In a knotter according to claim 4, wherein the locking means are rendered operative immediately after the billhook has effected rotation of the cam.

6. In a knotter according to claim 4, wherein the locking means comprise an extension on the cam and an extension on the billhook, the two extensions interacting at predetermined points in the first and second cycles of the billhook.

7. In a knotter according to claim 6, wherein the cam extension has four sides and the billhook extension has a flat face engageable with one of the four sides of the cam extension at a time.

8. In a knotter according to claim 6, wherein the billhook has a fixed jaw and a movable jaw, and wherein the billhook extension is provided on the fixed jaw.

9. In a knotter according to claim 2 wherein the cam is restrained from inadvertent rotation by spring means.

10. In a knotter according to claim 9 wherein the spring means comprises a cup spring arranged to abut against the cam.

11. In a knotter according to claim 9 wherein the spring means comprises a leafspring disposed to engage the cam.

12. In a knotter according to claim 1, wherein each of the cut-away corners of the cam has a working surface contactable by the billhook, the working surface being formed with a recess to accommodate movement of the billhook relative to the cam without effecting any movement of the billhook jaws relative to each other.

13. In a knotter according to claim 1, wherein each of the cut-away corners of the cam has a working surface contactable by the billhook, the working surface being concave to accommodate movement of the billhook relative to the cam without effecting any movement of the billhook jaws relative to each other.

14. In a knotter according to claim 1 wherein each corner of said other pair of opposed corners of the cam has a recess provided therein which positively locates the billhook to ensure both opening of the billhook jaws and rotation of the cam through 90 degrees.

15. A knotter comprising:
 (a) a twine holder operable to hold, during a knot-tying operation, a primary portion and a secondary portion of twine in which a knot is to be tied;
 (b) a billhook having two jaws capable of being opened and closed, the billhook being rotatable through a first cycle and a second cycle during the knot-tying operation;
 (c) the billhook being operable during the first cycle to position the primary and secondary portions of twine relative to each other in preparation for the knot-tying operation, the billhook being operable during the second cycle to tie the knot in the primary and second portions;
 (d) a cam mounted for rotation, said cam being generally square in plan view and having one pair of opposed cut-away corners so that, when one of the cut-away corners is contacted by the billhook, the jaws thereof remain closed, and another pair of opposed corners arranged so that, when one of them is contacted by the billhook, the jaws thereof are opened.

* * * * *